US012313240B1

(12) United States Patent
Cao et al.

(10) Patent No.: US 12,313,240 B1
(45) Date of Patent: May 27, 2025

(54) SWIMMING POOL LAMP

(71) Applicant: Shenzhen Huaxiang Technology Co., Ltd., Guangdong (CN)

(72) Inventors: Xianbo Cao, Heilongjiang (CN); Qicheng Feng, Guangdong (CN)

(73) Assignee: Shenzhen Huaxiang Technology Co., Ltd., Shenzhen (CN)

(*) Notice: Subject to any disclaimer, the term of this patent is extended or adjusted under 35 U.S.C. 154(b) by 0 days.

(21) Appl. No.: 18/813,701

(22) Filed: Aug. 23, 2024

(30) Foreign Application Priority Data

Jan. 25, 2024 (CN) ........................ 202420182747.2

(51) Int. Cl.

| | |
|---|---|
| ***F21S 8/00*** | (2006.01) |
| ***F21S 9/02*** | (2006.01) |
| ***F21V 17/10*** | (2006.01) |
| ***F21V 23/04*** | (2006.01) |
| ***F21V 23/06*** | (2006.01) |
| ***F21V 31/00*** | (2006.01) |
| ***F21W 131/401*** | (2006.01) |
| ***F21Y 105/10*** | (2016.01) |
| ***F21Y 113/00*** | (2016.01) |
| ***F21Y 115/10*** | (2016.01) |

(52) U.S. Cl.

CPC ................ *F21S 8/033* (2013.01); *F21S 9/02* (2013.01); *F21V 17/104* (2013.01); *F21V 17/105* (2013.01); *F21V 23/0435* (2013.01); *F21V 23/06* (2013.01); *F21V 31/005* (2013.01); *F21W 2131/401* (2013.01); *F21Y 2105/10* (2016.08); *F21Y 2113/00* (2013.01); *F21Y 2115/10* (2016.08)

(58) Field of Classification Search

CPC .......... F21S 8/033; F21S 9/02; F21V 17/104; F21V 17/105; F21V 23/0435; F21V 23/06; F21V 31/005; F21W 2131/401; F21Y 2105/10; F21Y 2113/00; F21Y 2115/10

See application file for complete search history.

(56) References Cited

U.S. PATENT DOCUMENTS

| | | | | |
|---|---|---|---|---|
| 11,112,091 | B2 * | 9/2021 | Xiao | F21V 7/0083 |
| 11,555,607 | B1 * | 1/2023 | Wei | F21V 5/007 |
| 12,007,103 | B1 * | 6/2024 | Gong | F21V 21/096 |
| 2006/0176686 | A1 * | 8/2006 | McVicker | F21S 9/022 362/183 |
| 2018/0238533 | A1 * | 8/2018 | Dyck | F21V 31/005 |
| 2020/0386388 | A1 * | 12/2020 | Dyck | F21V 21/30 |

* cited by examiner

*Primary Examiner* — Tsion Tumebo

(57) ABSTRACT

A swimming pool lamp is disclosed, including a lamp body provided in the swimming pool, and a wireless control component for sending and receiving remote control signals. Because the lamp body and the wireless control component are split setup, it can effectively avoid the wireless control component getting into water to affect the signal transmitting and receiving. The lamp body can be remotely controlled by a terminal provided, and the terminal can change luminous effects of LED lamp beads provided on the surface of the lamp panel. A mechanical button is provided on the surface of the lamp body, so that the luminous effects of the LED lamp beads on the lamp panel can be controlled by the mechanical button in conjunction with a control button without using the terminal for remote control, thus realizing a variety of control effects of the swimming pool lamp.

9 Claims, 8 Drawing Sheets

SWIMMING POOL LAMP

TECHNICAL FIELD

The present application relates to the technical field of lamps, and in particular to a swimming pool lamp.

BACKGROUND

Swimming pools are places where people engage in swimming sports, and where people can play or compete. Most of the swimming pools are built on the ground and can be divided into general swimming pools and heated swimming pools according to water temperature, and since people do not necessarily swim during the day, some swimming pools will choose to install lamps above the swimming pools to illuminate the swimming pools. But the water in the swimming pools will play a refracting and reflecting role on the light of the lamps, which will have an effect on the vision of swimmers, and therefore it is necessary to provide a specific swimming pool lamp for the swimming pools.

The swimming pool lamp is a kind of underwater lighting fixtures, usually installed in the side walls or bottom of the swimming pools, and the swimming pool lamp in use will illuminate the water, which can give the swimmers in the swimming process to bring different fun. However, existing swimming pool lamps are generally directly fixed in the swimming pools by using bolts and other fixed modes, when maintenance needs to be performed on the swimming pool lamps, the bolts need to be removed for disassembly, and this process is more cumbersome. The existing swimming pool lamps are generally controlled by buttons provided on the lamps or an antenna is provided in the interior of the lamps, such structural design is not reasonable enough, not intelligent enough, and also does not have the function of long-distance control. Moreover, the antenna is provided in the water, which will affect the wireless signal transmission, resulting in unstable signal transmission and affecting control of the underwater lights.

Based on above reasons, this application proposes a split type, easy to dismantle and install, can be remotely operated and will not affect the signal transmission of the swimming pool lamp.

SUMMARY

The present disclosure aims to provide a novelty swimming pool lamp to address problems mentioned in the background.

To achieve above objective, the present disclosure adopts following technical solutions. In some embodiments of the present disclosure, a swimming pool lamp is provided, including a lamp body provided in the swimming pool and a wireless control component for sending and receiving remote control signals, where the wireless control component is installed outside the swimming pool. The lamp body is, but not limited to, square or round.

Herein the lamp body includes a lampshade, a lamp housing and a first mounting base. The first mounting base is directly bonded to a pool wall under water by glue, the lampshade is connected with the lamp housing and forms a first mounting chamber between therein, and the lamp housing is installed on sides of the first mounting base. A lamp panel is provided in the first mounting chamber, and LED lamp beads, a signal receiving module and a control module are provided on a surface of the lamp panel. The wireless control component is configured to transmit a control signal, and the signal receiving module is configured to receive the control signal and control the LED lamp beads to light up in different colors through the control module to produce a luminous effect.

In some preferred embodiments of the present disclosure, a plurality of positioning posts is provided in the lamp housing, and the number of the positioning posts is at least 4. The surface of the lamp panel is provided with positioning holes corresponding to the positioning posts, and the positioning posts are interspersed with the positioning holes. A first battery is provided between the plurality of the positioning posts, through the positioning posts which can play a role in limiting and fixing the first battery to improve the stability of the first battery. The first battery is configured to supply power to the lamp panel, and the first battery is located at bottom of the lamp panel.

In some preferred embodiments of the present disclosure, a plurality of reflective cups is provided in the lampshade, the reflective cups correspond to positions of the LED lamp beads that located on the surface of the lamp panel, one end of the lamp panel is provided with a control button, and one side of the lamp housing is provided with a mechanical button being directly faced the control button.

In some preferred embodiments of the present disclosure, a first charging port is provided in the lamp housing, the first charging port is electrically connected with the first battery, a sealing groove is provided around the first charging port that located on bottom of the lamp housing, and the sealing groove is provided with a first sealing plug.

In some preferred embodiments of the present disclosure, the bottom of the lamp housing is provided with a plurality of mounting grooves, metal parts is provided in the mounting grooves 115, and a first magnetic member is provided on the first mounting base.

In some preferred embodiments of the present disclosure, the first mounting base includes a first mounting plate and a second mounting plate. The first magnetic member is provided between the first mounting plate and the second mounting plate, the first mounting plate is provided with sockets at bottom corners, the second mounting plate is provided with first protrusions corresponding to the sockets at four corners, and the first protrusions are snapped into the sockets.

In some preferred embodiments of the present disclosure, the lamp housing is provided with locating slots at bottom corners, the first mounting plate is provided with second protrusions corresponding to the locating slots at corners, and dimensions of the second protrusions match dimensions of the locating slots.

In some preferred embodiments of the present disclosure, the wireless control component includes a wireless transmission mechanism and a second mounting base. Herein the wireless transmission mechanism includes a base and a device housing, the base and the device housing are connected and internally formed a second mounting chamber. Surface of the base is installed with a second battery and a wireless carrier board having a signal transceiver module, the second battery and the wireless carrier board are located in the second mounting chamber, and the second battery is configured to supply power to the wireless carrier board. The device housing is provided with a second charging port at one side, the second charging port is electrically connected with the second battery, and the second charging port is provided with a second sealing plug. The device housing is provided with a mounting hole at another side, a switch button is provided in the mounting hole, and the switch button is configured to control power supply for the wireless carrier board.

In some preferred embodiments of the present disclosure, the second mounting base is provided with a groove on surface, a second magnetic member is provided in the second mounting base, the base is also provided with the metal parts on bottom, and side walls of the second mounting base is provided with notches.

In some preferred embodiments of the present disclosure, the swimming pool lamp further includes a terminal for sending remote signals.

In some preferred embodiments of the present disclosure, the first magnetic member and the second magnetic member are metal magnets or ferrite magnets, and shapes of the first magnetic member and the second magnetic member include, but are not limited to, polygons such as rounds, triangles, or squares.

The swimming pool lamp of the present disclosure has at least the following beneficial effects and advantages compared to the existing technologies. Since the lamp body and the wireless control component are split setup, and the wireless control component is installed outside the swimming pool, the wireless signal transmission will not be affected by water, so that the lamp body can be controlled more stably. Further through set of the wireless control component with the terminal to remote control the lamp body, and at the same time due to the lamp body and the wireless signal component are signal connections, so the two do not need to connect a power cord, which is more convenient for the installation of the swimming pool lamp. And meanwhile because of the magnetic adsorption connection between the lamp housing and the first mounting base, the maintenance of the lampshade and components inside the lamp housing can be carried out by simply removing the lamp housing from the surface of the first mounting base. This operation is simple and convenient, and more conducive to staff to improve the efficiency of maintenance.

BRIEF DESCRIPTION OF THE DRAWINGS

The following accompanying drawings are used to provide a further understanding of the swimming pool lamp of the present disclosure, form a part of the specification, and are used in conjunction with the embodiments of the present disclosure for the purpose of explaining the present invention and do not constitute a limitation of the present invention.

Figure 1:
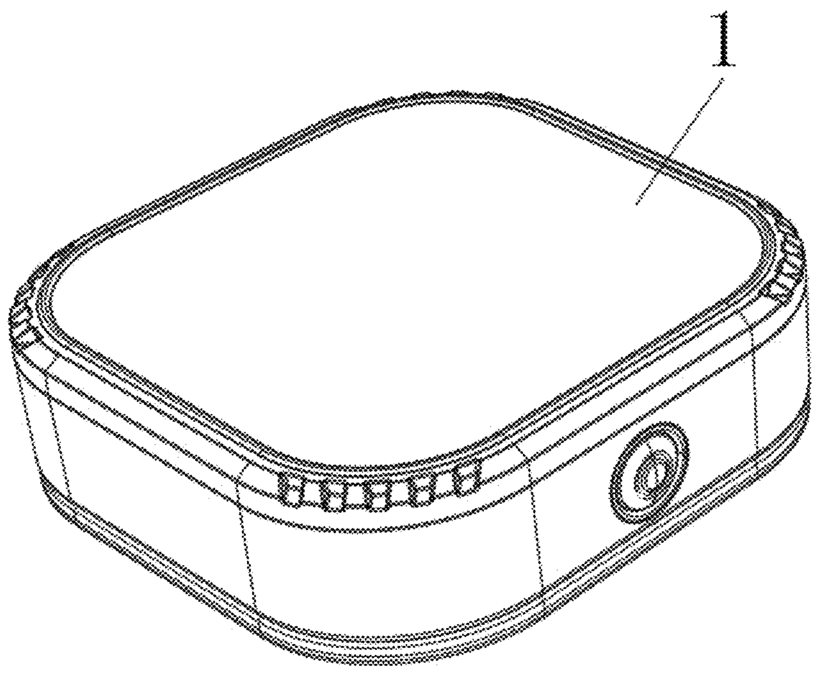
FIG. 1 shows a structure schematic diagram of a square-shaped lamp body in accordance with some embodiments of the present disclosure.
Figure 2:
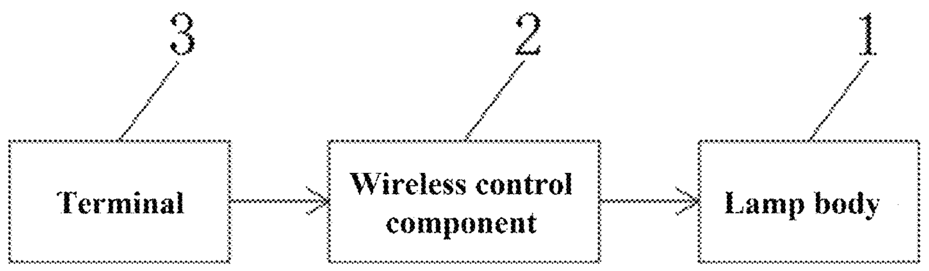
FIG. 2 shows a functional block diagram of a swimming pool lamp in accordance with some embodiments of the present disclosure.

In the drawings, reference signs are as follows. 1. Lamp body, 11. Lampshade, 12. Lamp housing, 13. First mounting base, 131. First mounting plate, 132. Second mounting plate, 133. First magnetic member, 134. First protrusion, 145. Second protrusion, 14. Lamp panel, 15. LED lamp beads, 16. Positioning post, 17. Positioning hole, 18. First battery, 19. Reflective cup, 110. Control button, 111. Mechanical button, 112. First charging port, 113. Sealing groove, 114. First sealing plug, 115. Mounting groove, 116. Locating slot, 2. Wireless control component, 21. Wireless transmission mechanism, 211. Base, 212. Device housing, 213. Second battery, 214. Wireless carrier board, 215. Second charging port, 216. Second sealing plug, 217. Switch button, 22. Second mounting base, 221. Groove, 222. Notch, 3. Terminal.

DETAILED DESCRIPTION OF THE EMBODIMENTS

To make the objectives, the technical solutions and advantages of the embodiments of the present disclosure clearer, the technical solutions in the embodiments of the present disclosure will be described clearly and completely below in conjunction with the accompanying drawings. It is obvious that the described embodiments are a part of the embodiments of the present disclosure and not all of the embodiments. Based on the embodiments of the present disclosure, all other embodiments obtained by a person of ordinary skill in the art without creative labor shall fall within the scope of protection of the present disclosure.

Therefore, the following detailed description of the embodiments of the present disclosure provided in the accompanying drawings is not intended to limit the scope of protection of the present disclosure, but merely illustrates specific embodiments of the present disclosure. Based on the embodiments of the present disclosure, all other embodiments obtained by the person of ordinary skill in the art without creative labor shall fall within the scope of protection of the present invention.

It should be noted that similar symbols and letters in the accompanying drawings indicate similar items, and therefore, once an item is defined in one of the accompanying drawings, it does not need to be further defined and explained in the subsequent accompanying drawings.

In the description of the present disclosure, it is to be understood that the terms “center”, “longitudinal”, “lateral”, “length”, “width”, “thickness”, “up”, “down”, “front”, “back”, “left”, “right”, “vertical”, “horizontal”, “top”, “bottom”, “inside”, “outside”, “clockwise”, “counterclockwise” and the like indicating orientations or positional relationships are based on those shown in the accompanying drawings, and are intended only to facilitate the description of the present disclosure and to simplify the description, but not intended to indicate or imply that a device or an element referred to must have a particular orientation, and be constructed and operated with a particular orientation, and therefore are not to be construed as a limitation of the present disclosure.

In addition, the terms "first" and "second" are used for descriptive purposes only and are not to be understood as indicating or implying relative importance or implicitly specifying the number of technical features indicated. Thus, features defined with "first" or "second" may expressly or implicitly include one or more such features. And in the description of the present disclosure, "a plurality of" means two or more, unless otherwise expressly and specifically limited.

In the present disclosure, the terms "installed", "connected", "connection", "fixed" and the like are to be understood in a broad sense, unless otherwise expressly specified and limited. For example, it is may be a fixed connection, a removable connection, or integrated formation. It may be a direct connection, or an indirect connection through an intermediate medium, and it may be a connection within two elements or an interaction relationship between two elements. For the person of ordinary skill in the art, the specific meanings of the above terms in the present disclosure may be understood according to the specific circumstances.

In the present disclosure, unless otherwise expressly provided and limited, the first feature "above" or "below" the second feature may include the first feature and the second feature are direct contact, or the two are not directly contact but through another feature between them. Moreover, the first feature "above", "over", and "on" the second feature includes the first feature directly above and diagonally above the second feature, or simply indicating that the first feature is horizontally higher above the second feature. The first feature "below", "under" and "beneath" the second feature includes that first feature directly below and diagonally below the second feature, or simply indicating that the first feature is horizontally smaller than the second feature.

Referring to FIG. 1 to FIG. 7, in some embodiments of the present disclosure, a swimming pool lamp is provided, including a lamp body 1 fitted in the swimming pool, and a wireless control component 2 for sending and receiving remote control signals. The lamp body 1 is square, the lamp body 1 and the wireless control component 2 are connected by signals. The swimming pool lamp further includes a terminal 3 for sending remote control signals, the terminal 3 is configured to send control signals, the wireless control component 2 is configured to receive the control signals and realize remote control of the lamp body 1 through wireless signals. The lamp body 1 is installed on the bottom or side walls of the swimming pool, and the wireless control component 2 is installed on the outside of the swimming pool. Due to a split design between the lamp body 1 and the wireless control component 2, the signal transmission can be effectively avoided when the wireless control component 2 is affected by water ingress.

Figure 8:
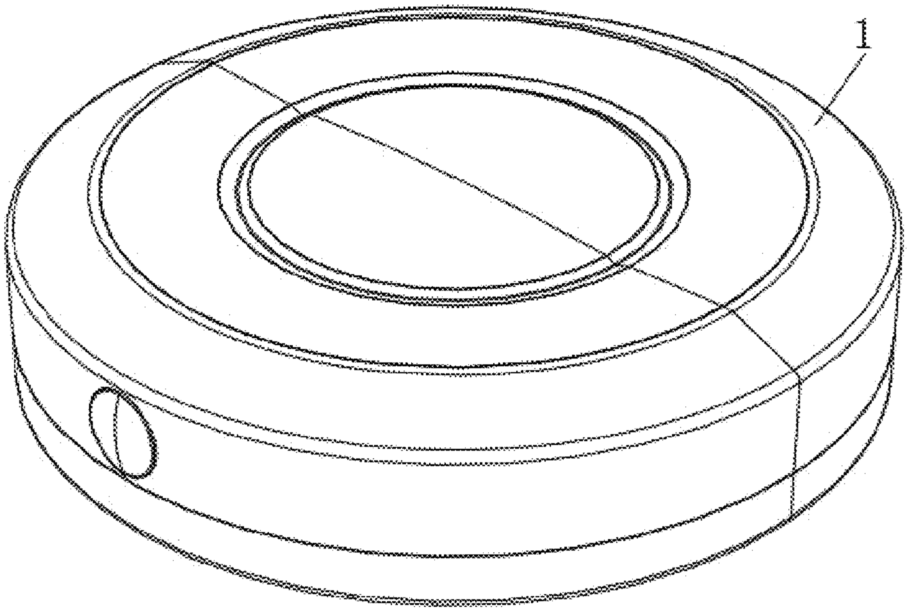
FIG. 8 shows a structure schematic diagram of a round-shaped lamp body in accordance with some embodiments of the present disclosure.
Figure 9:
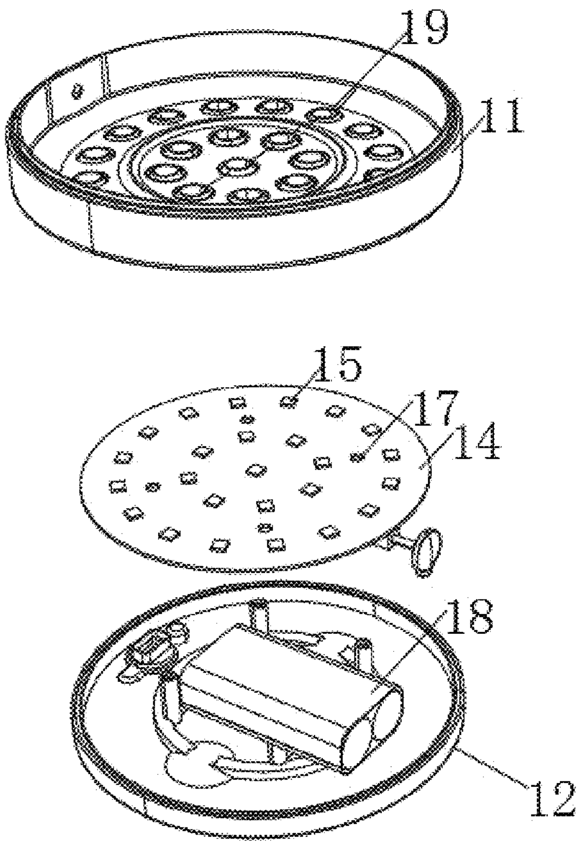
FIG. 9 shows an exploded view of the round-shaped lamp body in accordance with some embodiments of the present disclosure.

FIG. 8 shows a round-shaped lamp body.

Furthermore, the lamp body 1 can be remotely manipulated by setting of the terminal 3, and luminous effects of LED lamp beads 15 provided on a surface of a lamp panel 14 is able to be changed by the terminal 3. Moreover, a mechanical button 111 is provided on the surface of the lamp body 1, so that in a case of remote control without using the terminal 3, it is also possible to control the luminous effects of the LED lamp beads 15 on the surface of the lamp panel 14 by means of the mechanical button 111 in conjunction with the control button 110, thereby realizing a variety of control effects of the swimming pool lamp.

Figure 3:
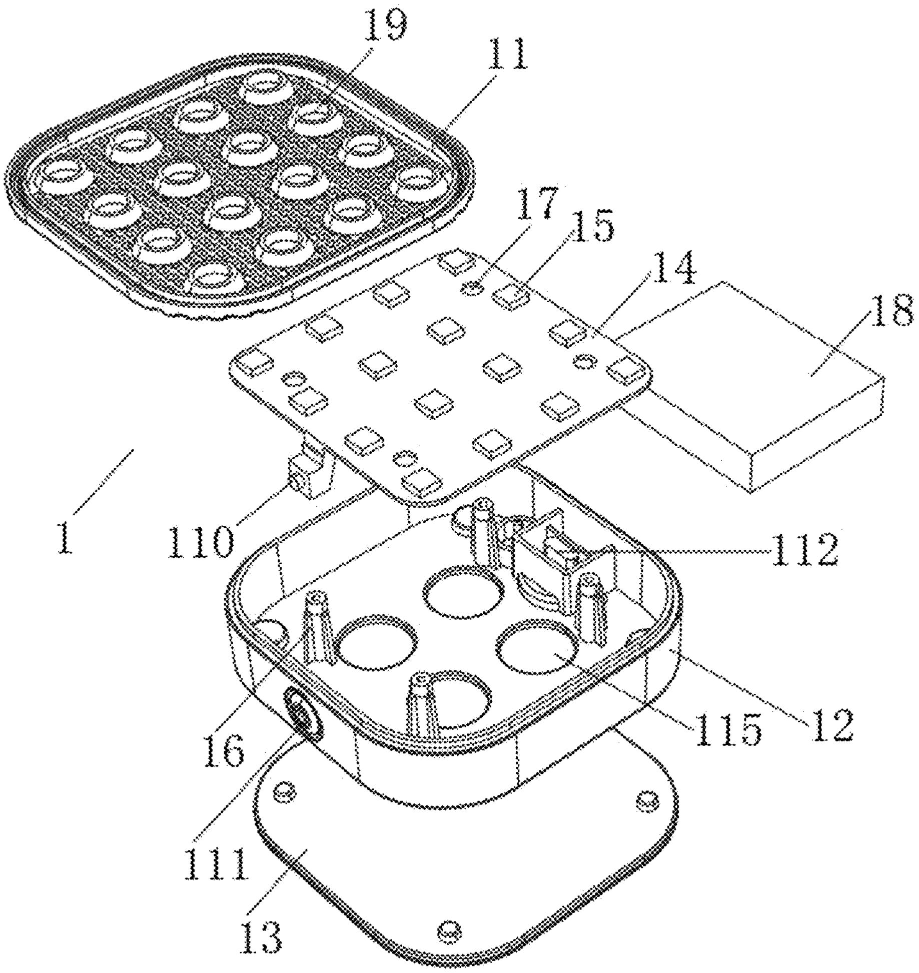
FIG. 3 shows an exploded view of the lamp body in accordance with some embodiments of the present disclosure.

Referring to FIG. 1 and FIG. 3, in some optional embodiments of the present disclosure, the lamp body 1 includes a lampshade 11, a lamp housing 12 and a first mounting base 13. The first mounting base 13 is directly bonded to a pool wall under water by glue, the lampshade 11 is connected with the lamp housing 12 and forms a first mounting chamber between therein, and the lamp housing 12 is installed on sides of the first mounting base 13. A lamp panel 14 is provided in the first mounting chamber, and the LED lamp beads 15, a signal receiving module and a control module are provided on the surface of the lamp panel 14. The wireless control component 2 is configured to transmit a control signal, and the signal receiving module is configured to receive the control signal and control the LED lamp beads 15 to light up in different colors through the control module to produce the luminous effects.

Meanwhile, in some preferred embodiments of the present disclosure, the terminal 3 can be a cell phone or a remote control, the cell phone is installed an APP for sending control signals, through the APP to send the control signals to the wireless control component 2, and the wireless control component 2 receives the control signals and decodes the control signals through a wireless carrier board 214, then sends the control signals to the signal receiving module in the lamp body 1 for decoding, and last the control module controls the LED lamp beads 15 to light up corresponding colors. The LED lamp beads 15 has red, green and blue light, and the lamp panel 14 is burned with different lighting effects program (such as red, orange, yellow, green, cyan, blue, purple alternately light up, running lights and other lighting effects, every time press the mechanical button to adjust the color alternately, and the light effects also includes follow the terminal 3 to play music for color change and follow a microphone sound to change colors), then through the control module, the lamp body 1 can be controlled to emit corresponding lighting effects. When the terminal 3 is the remote control, the surface of the remote control is provided with several remote control buttons corresponding to the light effects, and a staff makes the LED lamp beads 15 light up a corresponding light effect by pressing corresponding remote control buttons.

Referring to FIG. 3, in some optional embodiments of the present disclosure, a plurality of positioning posts 16 is fitted in the lamp housing 12, the surface of the lamp panel 14 is provided with positioning holes 17 corresponding to the positioning posts 16, and the positioning posts 16 are interspersed with the positioning holes 17. A first battery 18 is provided between the plurality of the positioning posts 16, the first battery 18 is configured to supply power to the lamp panel 14, and the first battery 18 is located at bottom of the lamp panel 14.

Specifically, by setting the positioning posts 16 to cooperate with the positioning holes 17 on the surface of the lamp panel 14, so that the lamp panel 14 can be fixed by the positioning posts 14, in this way the lamp panel 14 can be effectively improved in the stability of installation. Further, the first battery 18 is provided at the bottom of the lamp panel 14, by which the space inside the first mounting chamber can be utilized in a more reasonable manner, and meanwhile the lamp panel 14 can be powered by the first battery 18, so as to provide power support for the work of the lamp panel 14.

Referring to FIG. 3, in some optional embodiments of the present disclosure, a plurality of reflective cups 19 is provided in the lampshade 11, the reflective cups 19 correspond to positions of the LED lamp beads 15 that located on the surface of the lamp panel 14, one end of the lamp panel 14 is provided with a control button 110, and one side of the lamp housing 12 is provided with a mechanical button 111 being directly faced the control button 110.

Specifically, when installing the lampshade 11 with the lamp housing 12, the plurality of reflective cups 19 in the lampshade 11 will be set on the outside of the LED lamp beads 15 on the surface of the lamp panel 14, so that the reflective cups 19 can play the role of concentrating the light and effectively improve the luminous efficiency of the LED lamp beads 15. Furthermore, through the setting of the mechanical button 111 in conjunction with the control button 110, when the terminal 3 is not used to remotely control the lamp body 1, the staff can also press the mechanical button 111, and since the mechanical button 111 is directly opposite the control button 110, the control button 110 will be pressed by the mechanical button 111, so that the luminous effects of the LED lamp beads 15 can be artificially changed in this manner.

Figure 4:
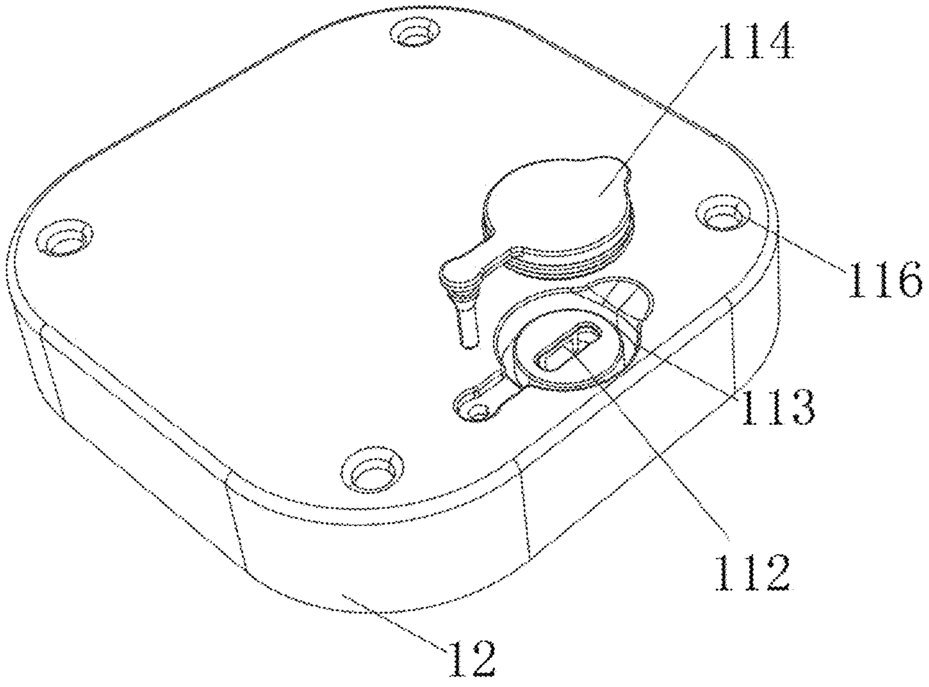
FIG. 4 shows a structure schematic diagram of bottom of the lamp body in accordance with some embodiments of the present disclosure.

Referring to FIG. 3 and FIG. 4, in some optional embodiments of the present disclosure, a first charging port 112 is provided in the lamp housing 12, the first charging port 112 is electrically connected with the first battery 18, a sealing groove 113 is provided around the first charging port 112 that located on bottom of the lamp housing 12, and the sealing groove 113 is provided with a first sealing plug 114.

Specifically, through setting of the first charging port 112 for charging the first battery 18, so when the first battery 18 does not have enough power, the first battery 18 can be charged by the staff, so as to enhance the usage time of the swimming pool lamp. The first charging port 112 may be a type-c interface or a lightning interface, and these interfaces are common household charging ports, so as to make it easier to quickly charge the first battery 18. Compared with the manners of existing built-in batteries, this does not require disassembling and replacing the battery, making the swimming pool lamp more convenient to use. Furthermore, by setting of the sealing plug 114, this can effectively seal the first charging port 112, so as to prevent water from entering into the swimming pool lamp.

Figure 5:
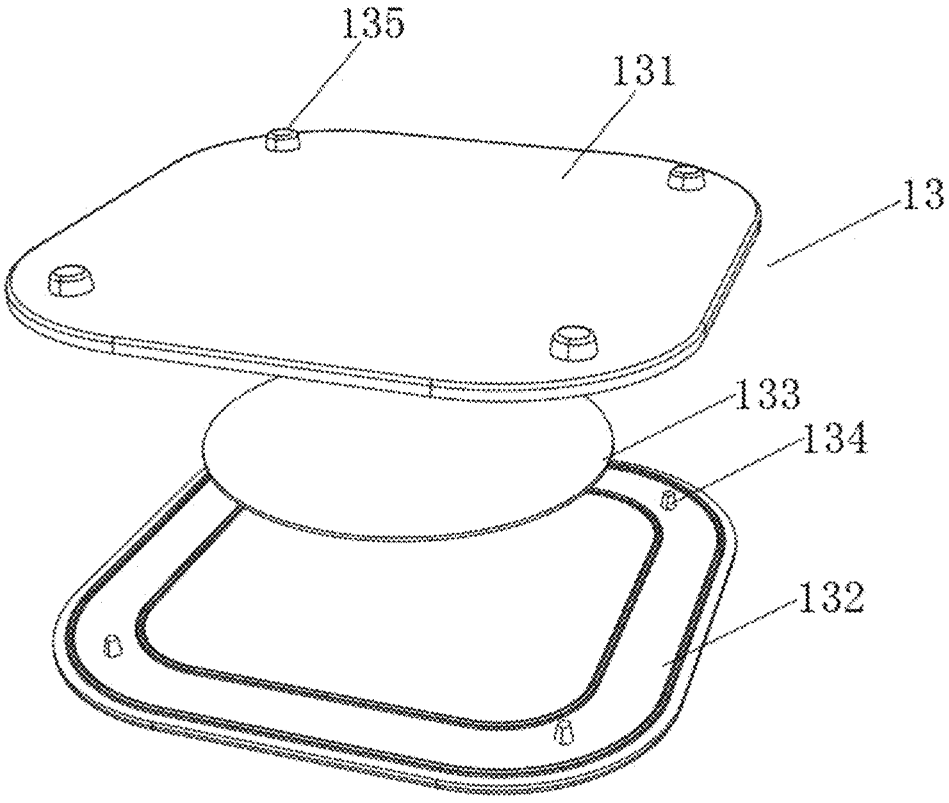
FIG. 5 shows an exploded view of a first mounting base in accordance with some embodiments of the present disclosure.

Referring to FIG. 3 and FIG. 5, in some optional embodiments of the present disclosure, the bottom of the lamp housing 12 is provided with a plurality of mounting grooves 115, metal parts is provided in the mounting grooves 115, and a first magnetic member 13 is provided on the first mounting base 133.

Specifically, the first mounting base 13 may be adhered to the side walls or the bottom of the swimming pool lamp by means of sticking a glue on the back, or may be adhered to the side walls or the bottom of the swimming pool lamp by means of brushing a special glue on the back, thereby no need bolts and other means of destroying the pool wall to install the first mounting base 13, this is conducive to improving the installation efficiency of the first mounting base 13. The special glue can realize underwater installation of the first mounting base 13 and the pool wall, so there is no need to drain the water in the swimming pool when installing the first mounting base 13, which can further enhance the efficiency of the adhesive installation of the first mounting base 13. Furthermore, the first magnetic member 133 is set to cooperate with the metal parts installed in the mounting grooves 115, so that the lampshade 11 can b connected with the first mounting base 13 by magnetic adsorption after being connected with the lamp housing 12, and thus in this way it is convenient for the staff to quickly remove the connected lampshade 11 and the lamp housing 12, thereby making it easier to maintain the structure within the first mounting chamber or to charge the first battery 18.

Referring to FIG. 5, in some optional embodiments of the present disclosure, the first mounting base 13 includes a first mounting plate 131 and a second mounting plate 132. The first magnetic member 133 is provided between the first mounting plate 131 and the second mounting plate 132, the first mounting plate 131 is provided with sockets at bottom corners, the second mounting plate 132 is provided with first protrusions 134 corresponding to the sockets at four corners, and the first protrusions 134 are snapped into the sockets.

Specifically, by setting of the first protrusions 134 and the sockets to facilitate a quick connection between the first mounting plate 131 and the second mounting plate 132, so that in this way the first magnetic member 133 is conveniently provided between the first mounting plate 131 and the second mounting plate 132, which makes it easier to replace the first magnetic member 133 when the magnetism of the first magnetic member 133 is weakened.

Referring to FIG. 4 and FIG. 5, in some optional embodiments of the present disclosure, the lamp housing 12 is provided with locating slots 116 at bottom corners, the first mounting plate 131 is provided with second protrusions 135 corresponding to the locating slots 116 at corners, and dimensions of the second protrusions 135 match dimensions of the locating slots 116

Specifically, when the bottom of the lamp housing 12 is affixed to the surface of the first mounting plate 131, the lamp housing 12 can be adsorbed and fixed by means of magnetic suction under the action of the first magnetic member 133 and the metal parts fitted in the mounting grooves 115, so that the lamp housing 12 can be disassembled and assembled more easily in this way. And under the action of the second protrusions 135 and the locating slots 116, the installing position of the lamp housing 12 can be limited, so that the first magnetic member 133 can generate stable magnetic force with the metal parts, thereby the lamp housing 12 can be stably magnetized on the surface of the first mounting base 13.

Figure 6:
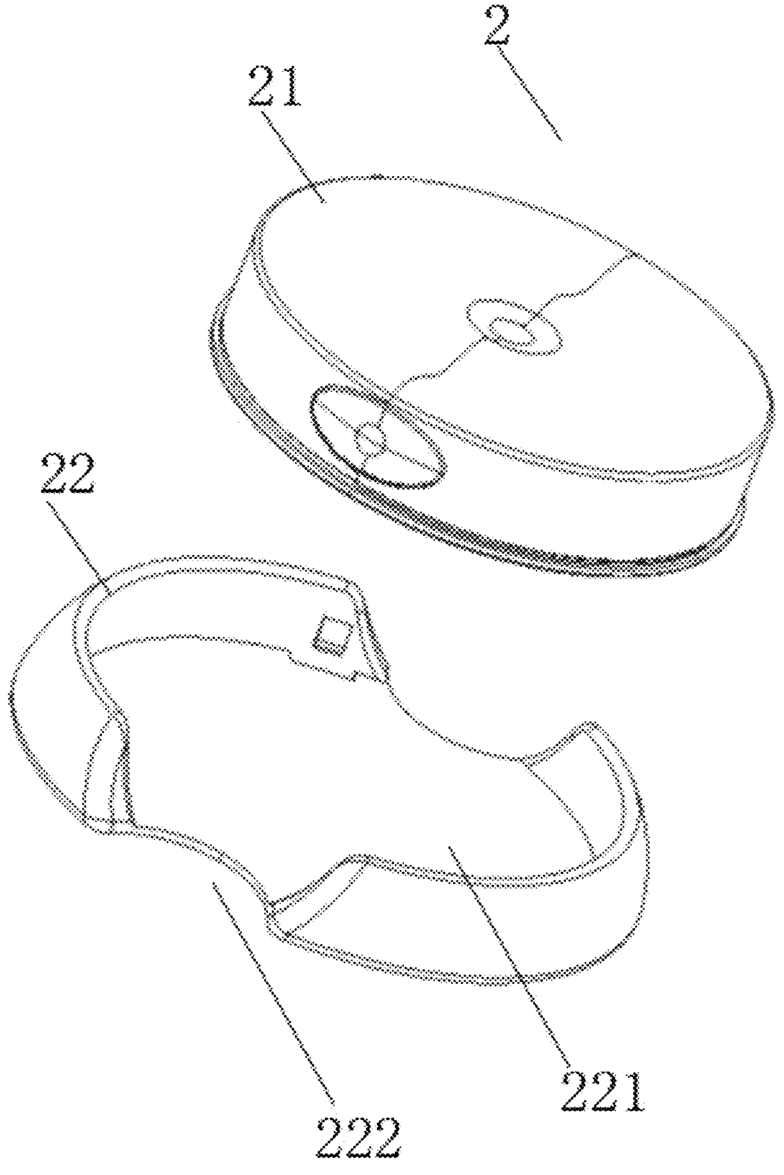
FIG. 6 shows a structure schematic diagram of a wireless control component in accordance with some embodiments of the present disclosure.
Figure 7:
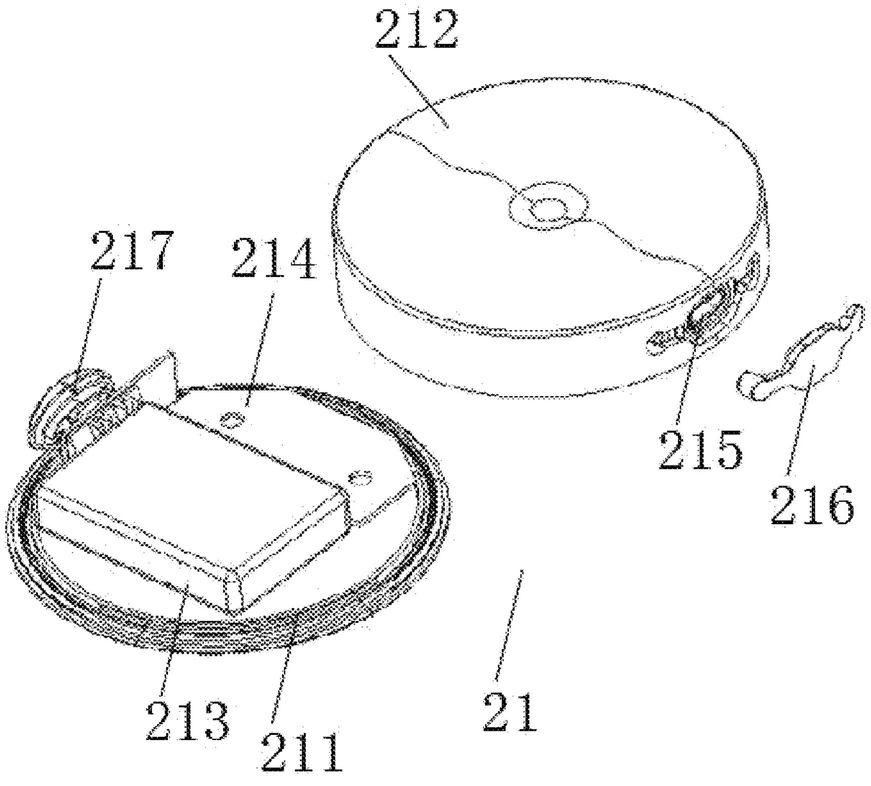
FIG. 7 shows an exploded view of a wireless transmission mechanism in accordance with some embodiments of the present disclosure.

Referring to FIG. 6 and FIG. 7, in some optional embodiments of the present disclosure, the wireless control component 2 includes a wireless transmission mechanism 21 and a second mounting base 22. The wireless transmission mechanism 21 includes a base 211 and a device housing 212, the base 211 and the device housing 212 are connected and internally formed a second mounting chamber. The surface of the base 211 is installed with a second battery 213 and a wireless carrier board 214 having a signal transceiver module, the second battery 213 and the wireless carrier board 214 are located in the second mounting chamber, and the second battery 213 is configured to supply power to the wireless carrier board 214. The device housing 212 is provided with a second charging port 215 at one side, the second charging port 215 is electrically connected with the second battery 213, and the second charging port 215 is provided with a second sealing plug 216. The device housing 212 is provided with a mounting hole at another side, a switch button 217 is provided in the mounting hole, and the switch button 217 is configured to control power supply for the wireless carrier board 214.

Specifically, by setting of the second battery 213 to supply power for the wireless carrier board 214, while the supply power for the wireless carrier board 214 is controlled by the switch button 217, and the second charging port 215 provided is capable of charging the second battery 213, thereby enhancing the endurance of the wireless control component 2. The second charging port 215 may be the type-c interface or the lightning interface, and the above interfaces are common household charging port, so as to facilitate the rapid charging of the second battery 213. Moreover, through setting of the second sealing plug 216, water can be prevented from entering into the second mounting chamber through the second charging port 215, causing the wireless carrier board 214 to come into contact with water and short-circuit. The wireless carrier board 214 is provided with a signal transceiver module, which can decode the control signals sent by the terminal 3 and send the decoded signal to the signal receiving module on the surface of the lamp panel 14, and the signal receiving module receives the control signals and then controls the luminous effects of the LED lamp beads 15 through the control module.

Referring to FIG. 6, in some optional embodiments of the present disclosure, the second mounting base 22 is provided with a groove 221 on surface, a second magnetic member is provided in the second mounting base 22, the base 211 is also provided with the metal parts on bottom, and side walls of the second mounting base 22 is provided with notches 222.

Specifically, by setting of the groove 221, the second magnetic member and the metal parts fitted on the bottom of the base 211, the wireless transmission mechanism 21 and the second mounting base 22 can also be magnetically connected, so that the second mounting base 22 can be installed not only on the ground near the swimming pool, but also on the wall near the swimming pool. Moreover, the installed mode of the second mounting base 22 can also be fixed with a sticking adhesive on the back or applying the glue, and the notches 222 are provided to facilitate the staff to quickly remove the wireless transmission mechanism 21 from the groove 221, so as to utilize the staff to quickly maintenance or charging of the second battery 213.

Working principle of the swimming pool lamp of the present disclosure is further described below. The lamp body 1 is installed in the side wall or the bottom of the swimming pool, the wireless control component 2 is installed on the ground or the wall outside of the swimming pool, the staff sends the control signals through the terminal 3, the wireless control component 2 receives the control signals and sends the control signals to the signal receiving module in the lamp body 1, so as to control the LED lamp beads 15 to light up different colors through the control module to produce different luminous effects. Thus, not only can the luminous effects of the LED lamp beads 15 be adjusted by selecting the wireless control, but also the luminous effects of the LED lamp beads 15 can be adjusted manually by the mechanical button 111. Therefore the swimming pool can be controlled in various ways. Meanwhile because in the lamp body 1 the lamp housing 12 and the first mounting base 13 are connected magnetically, it is more convenient for the staff to disassemble the lamp body 1 for maintenance. In addition, the lamp body 1 and the wireless control component 2 are split setup, which on the one hand can reduce the risk of the signal transmitting and receiving ability being weakened due to the wireless transmission mechanism 21 being in the water, and on the other hand, it also can avoid blocking the light emission of the LED lamp beads 15 when the wireless transmission mechanism 21 is installed in the first mounting chamber.

Finally, it should be noted that the foregoing description is only some preferred embodiments of the present disclosure, and is not intended to limit the present invention. Although the swimming pool lamp of the present disclosure has been described in detailed with reference to the above embodiments, for those skilled in the art, they still can modify the technical solutions disclosed in the above embodiments, or make equivalent substitutions for some of the technical features therein. Any modifications, equivalent substitutions, and improvements made within the concept and principles of the present invention shall be included in the scope of protection of the present invention.

What is claimed is:

1. A swimming pool lamp, comprising a lamp body provided in the swimming pool, and a wireless control component for sending and receiving remote control signals, wherein the wireless control component is installed outside the swimming pool; wherein the lamp body comprises a lampshade, a lamp housing and a first mounting base, the first mounting base is directly bonded to a pool wall under water by glue, the lampshade is connected with the lamp housing and forms a first mounting chamber between therein, and the lamp housing is installed on sides of the first mounting base;

wherein a lamp panel is provided in the first mounting chamber, and LED lamp beads, a signal receiving module and a control module are provided on a surface of the lamp panel;

wherein the wireless control component is configured to transmit a control signal, and the signal receiving module is configured to receive the control signal and control the LED lamp beads to light up in different colors through the control module to produce a luminous effect;

wherein the wireless control component comprises a wireless transmission mechanism and a second mounting base;

wherein the wireless transmission mechanism comprises a base and a device housing, the base and the device housing are connected and internally formed a second mounting chamber;

wherein a surface of the base is installed with a second battery and a wireless carrier board having a signal transceiver module, the second battery and the wireless carrier board are located in the second mounting chamber, and the second battery is configured to supply power to the wireless carrier board;

wherein one side of the device housing is provided with a second charging port, the second charging port is electrically connected with the second battery, and the second charging port is provided with a second sealing plug; and wherein another side of the device housing is provided with a mounting hole, a switch button is provided in the mounting hole, and the switch button is configured to control power supply for the wireless carrier board.

2. The swimming pool lamp according to claim 1, wherein a plurality of positioning posts is provided in the lamp housing, the surface of the lamp panel is provided with positioning holes corresponding to the positioning posts, and the positioning posts are interspersed with the positioning holes; and wherein a first battery is provided between the plurality of the positioning posts, the first battery is configured to supply power to the lamp panel, and the first battery is located at the bottom of the lamp panel.

3. The swimming pool lamp according to claim 1, wherein a plurality of reflective cups is provided in the lampshade, the reflective cups correspond to positions of the LED lamp beads that located on the surface of the lamp panel, one end of the lamp panel is provided with a control button, and one side of the lamp housing is provided with a mechanical button being directly faced the control button.

4. The swimming pool lamp according to claim 2, wherein a first charging port is provided in the lamp housing, the first charging port is electrically connected with the first battery, a sealing groove is provided around the first charging port that located on bottom of the lamp housing, and the sealing groove is provided with a first sealing plug.

5. The swimming pool lamp according to claim 1, wherein the bottom of the lamp housing is provided with a plurality of mounting grooves, metal parts are provided in the mounting grooves, and a first magnetic member is provided on the first mounting base.

6. The swimming pool lamp according to claim 5, wherein the first mounting base comprises a first mounting plate and a second mounting plate;

wherein the first magnetic member is provided between the first mounting plate and the second mounting plate, the bottom corners of the first mounting plate are provided with sockets, the four corners of the second mounting plate is provided with first protrusions corresponding to the sockets, and the first protrusions are snapped into the sockets.

7. The swimming pool lamp according to claim 6, wherein bottom corners of the lamp housing is provided with locating slots, corners of the first mounting plate is provided with second protrusions corresponding to the locating slots, and dimensions of the second protrusions match dimensions of the locating slots.

8. The swimming pool lamp according to claim 1, wherein a surface of the second mounting base is provided with a groove, a second magnetic member is provided in the second mounting base, a bottom of the base is provided with the metal parts, and side walls of the second mounting base is provided with notches.

9. The swimming pool lamp according to claim 1, wherein further comprises a terminal for sending remote signals.

* * * * *